Sept. 5, 1967     T. LUKSICH     3,339,708
CONTROL SYSTEM FOR CONVEYORS
Filed July 6, 1966     2 Sheets-Sheet 1
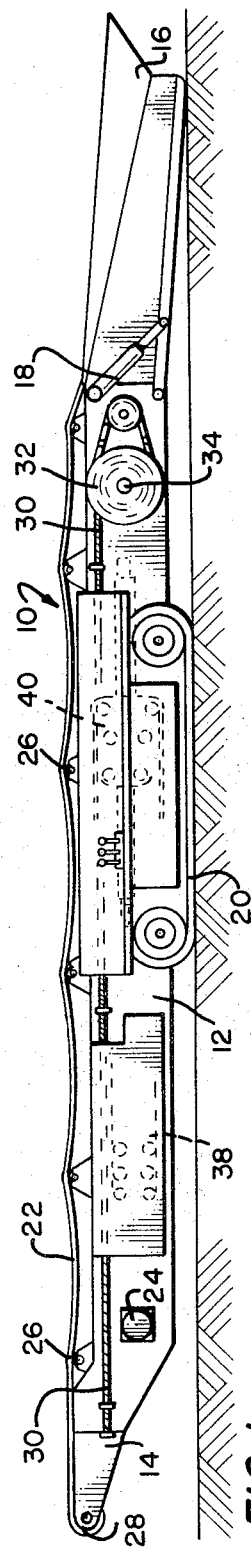
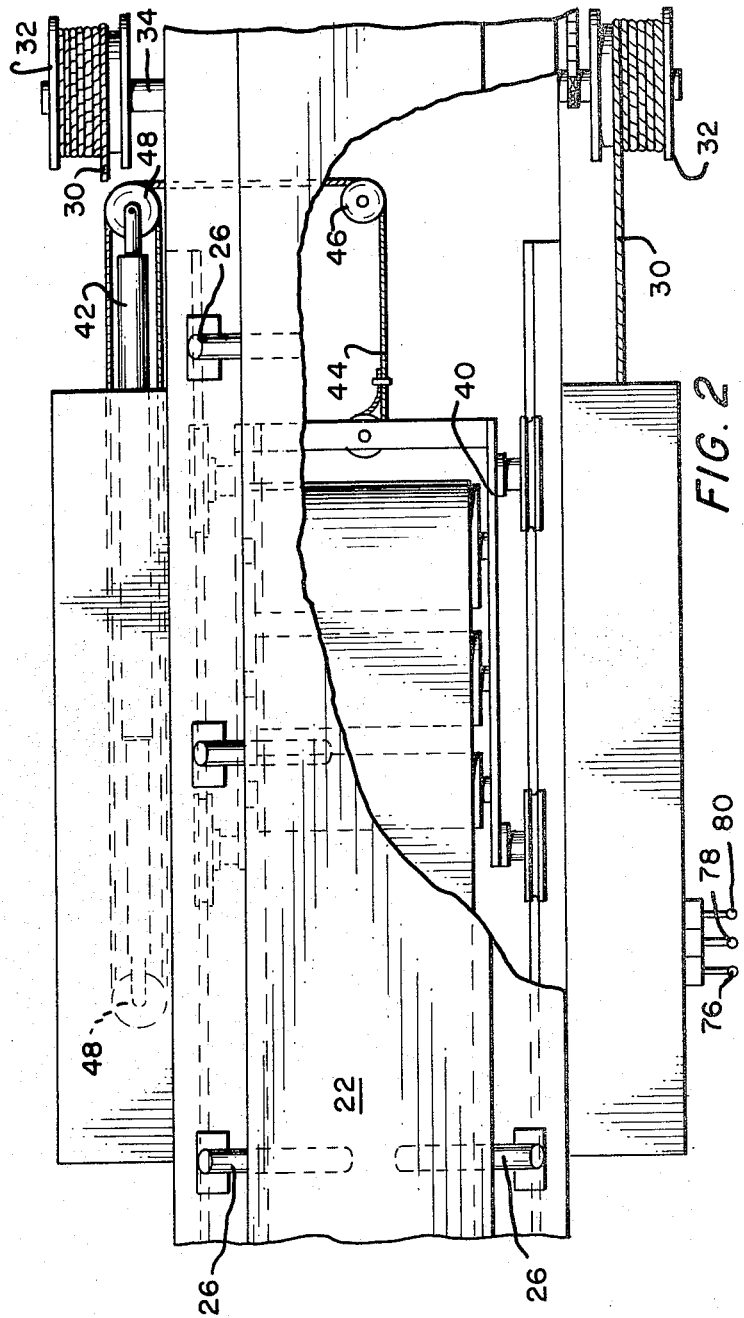
INVENTOR.
THOMAS LUKSICH
BY
ATTORNEY

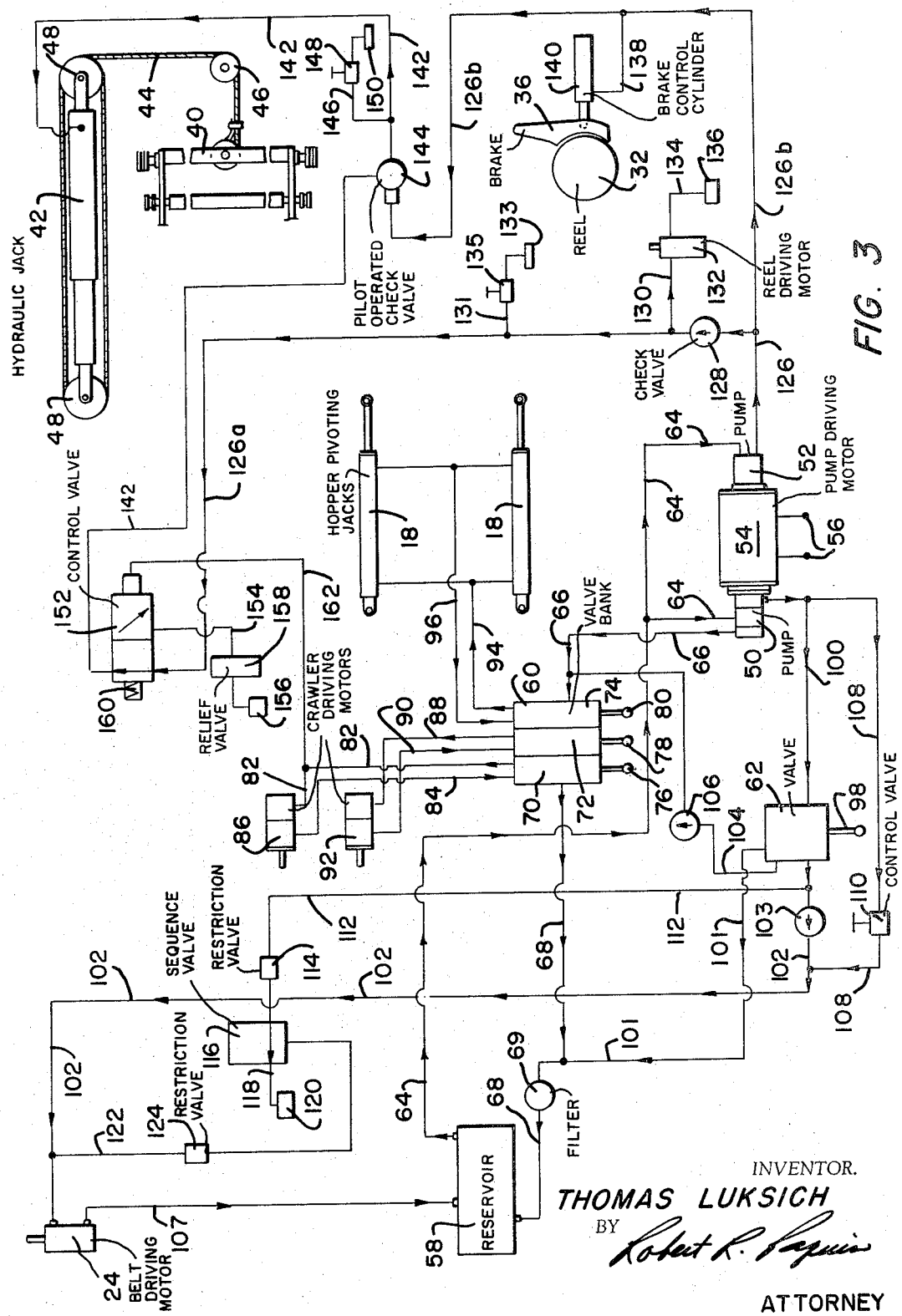

United States Patent Office 3,339,708
Patented Sept. 5, 1967

3,339,708
CONTROL SYSTEM FOR CONVEYORS
Thomas Luksich, North Charleroi, Pa., assignor to Lee-Norse Company, Charleroi, Pa., a corporation of Delaware
Filed July 6, 1966, Ser. No. 563,213
18 Claims. (Cl. 198—139)

ABSTRACT OF THE DISCLOSURE

A fluid pressure control system for an extendible conveyor which includes belt storage means operable to vary the effective length of the conveying belt and a fluid motor operating the belt storage means, comprising a valve for maintaining pressure fluid in this fluid motor, when the latter is exhausting, at a predetermined pressure. In addition, a bypass is provided for bypassing pressure fluid operating the fluid motor which longitudinally drives the conveying belt around this latter fluid motor during its initial operation.

The disclosure

This invention relates to conveyors and has more particular reference to the provision of a new and improved fluid pressure control system which is particularly constructed and arranged for controlling the operation of an extendible conveyor or the like.

An extendible conveyor of the type employed in mining operations generally comprises a pair of relatively movable frame sections which are each connected to one of the end turns of an endless conveying belt. The conveying belt is suitably wound on a belt storage apparatus carried by one of the frame sections to be automatically adjusted in effective length upon relative movement of the frame sections. The conveying belt is supported intermediate the frame sections, when the latter are in spaced relationship, by a plurality of supporting rollers which are located by wire ropes extending longitudinally between the frame sections. These wire ropes, similarly to the conveying belt, are automatically adjusted in effective length upon relative movement of the frame sections by a rope storage means which is usually carried by one of the frame sections.

An object of the present invention is to provide a new and improved fluid pressure control system which is particularly constructed and arranged for controlling the tension on the conveying belt of an extendible conveyor of the type set forth or the like.

Another object of the invention is to provide a new and improved fluid pressure control system of the type set forth which is particularly constructed and arranged to maintain the conveying belt under tension during its variance in effective length.

Another object is to provide a new and improved fluid pressure control system of the type set forth which is particularly constructed and arranged to prevent overstressing of the conveying belt during its initial longitudinal movement when starting from rest.

The foregoing objects, and the other objects and advantages of the invention which will be apparent from the following description taken in connection with the accompanying drawings, are obtained by the provision of a control system for an extendible conveyor which comprises a plurality of relatively movable frame sections, a conveying belt extending longitudinally between the frame sections, belt storage means connected to the conveying belt operable to vary the effective length of the conveying belt during relative movement of the frame sections, and a fluid motor connected to the belt storage means for operating the belt storage means. This control system comprises a source of pressure fluid, and a conduit means connecting the fluid motor with the source of pressure fluid for supplying pressure fluid from the source to the fluid motor and for exhausting pressure fluid from the fluid motor. A valve means is interposed within the conduit means for alternatively directing pressure fluid through the conduit means to the fluid motor and exhausting pressure fluid from the fluid motor through the conduit means. A valve is provided for maintaining the pressure fluid in the fluid motor, when the motor is exhausting, at a pressure sufficient to cause the fluid motor to maintain tension on the conveying belt. The valve means is preferably connected to a second fluid operated motor, provided for effecting relative movement of the frame sections, such that its operation is controlled by the second motor, and the conduit means suitably connected such that the exhausting of pressure fluid from the first mentioned fluid motor is restricted in the event that the pressure fluid flowing from the source falls below a minimum pressure.

This control system also preferably includes a third fluid motor for longitudinally driving the conveying belt, conduit means connecting the third fluid motor with the source of pressure fluid for supplying pressure fluid from the source to the third motor to actuate the latter, and means for temporarily bypassing a portion of the pressure fluid flowing through this latter conduit means around the third motor during its initial actuation by pressure fluid from the source.

Referring to the drawings:

FIG. 1 is an elevational view, with parts shown in dotted lines for the purposes of description, of an extendible conveyor including a fluid pressure control system constructed in accordance with the present invention;

FIG. 2 is an enlarged, partially broken away, longitudinal view of the extendible conveyor shown in FIG. 1; and FIG. 3 is a diagrammatic view of the embodiment of the fluid pressure control system employed on the extendible conveyor shown in FIGS. 1 and 2.

Referring more particularly to the drawings wherein similar reference characters designate corresponding parts throughout the several views, the illustrated extendible conveyor 10 comprises a supporting frame having an elongated, head or loading section 12 and a tail or discharge section 14. The head section 12 is pivotally connected at its head end to a loading hopper 16 which is pivotable relative to the head section 12 by a plurality of double-acting hydraulic jacks 18 connected between the loading hopper 16 and the head section 12. The head section 12 is ground supported and longitudinally movable by traction means such as the crawler treads 20 which are located adjacent the opposing sides of the head section 12.

The tail section 14 is detachably connected to the tail end of the head section 12 such that in the extreme retracted position of the conveyor 10, as shown in FIG. 1, the tail section 14 is carried by the head section 12 for longitudinal movement with the latter. Thus, in the illustrated, extreme retracted position of the conveyor 10, the tail section 14 and the head section 12 cooperate to form a unitary, rigid, compact conveying bridge. When the conveyor 10 is extended, the tail section 14 is detached from the head section 12 to permit independent longitudinal movement of the head section 12. An anchor means, such as a plurality of vertically extending anchor jacks (not shown), is connected to the tail section 14 to support the latter in a fixed position. Thereafter, the head section 12 may be longitudinally moved independently of the tail section 14.

An endless conveying belt 22 longitudinally connects the head section 12 with the tail section 14 and extends into the loading hopper 16 which is carried by the head section 12. The endless conveying belt 22 is longitudinally driven to transport mined material deposited in the loading hopper 16 to the tail section 14 by a fluid operated motor 24 carried by the head section 12. The endless conveying belt 22 is supported and guided throughout its longitudinal movement by a plurality of troughing idlers 26 carried by the upper surface of the head section 12, an end idler 28 carried by each of the tail section 14 and the loading hopper 16, and sufficient other idlers and rollers (not shown) carried by the head section 12 and the tail section 14 to maintain the endless conveying belt 22 in alignment. The endless conveying belt 22 is also supported and guided, when the conveyor 10 is in an extended position, by a plurality of troughing idlers carried by ground mounted, supporting stands (not shown) which are manually inserted between the head section 12 and the tail section 14.

The supporting stands are positioned and maintained upright by a pair of wire ropes 30 which extend between the head section 12 and the tail section 14 and are located upon opposing sides of the head section 12. The wire ropes 30 are each connected at one of their ends to the tail section 14. The opposing end of each of the wire ropes 30 is wound on a rope drum or reel 32 carried by the head end of the head section 12. The reels 32 are carried by a single rotatably driven shaft 34 extending transversely through the head section 12 and are rotatable with the shaft 34. A spring engaged, fluid released brake 36 is pivotably carried by the head section 12 adjacent one of the reels 32 for locking the reels 32 and the shaft 34 against rotation.

The endless conveying belt 22 is automatically adjusted in effective length during the extension and retraction of the conveyor 10 by a belt storage apparatus or means which is located within the head section 12. The belt storage apparatus comprises a first or stationary bank 38 of rotatable rollers and a second or movable bank 40 of rotatable rollers which is movable longitudinally within the head section 12. The endless conveying belt 22 is suitably wound on the roller banks 38, 40 to be increased in effective length during the movement of the movable roller bank 40 towards the stationary roller bank 38 and, conversely, decreased in effective length during the movement of the movable roller bank 40 from the stationary roller bank 38. The movable roller bank 40 is drawn towards the stationary roller bank 38 by the pull of the endless conveying belt 22 arising from movement of the head section 12 from the tail section 14. The movable roller bank 40 is drawn from the stationary roller bank 38 by a single-acting, hydraulic jack fluid motor 42 which is connected to the movable roller bank 40 by a wire rope 44. The wire rope 44, as illustrated in FIGS. 2 and 3, extends around a sheave 46 intermediate the movable roller bank 40 and the hydraulic jack 42 and extends around sheaves 48 carried by the opposing ends of the latter such that the extension of the hydraulic jack 42 functions to draw the movable roller bank 40 from the stationary roller bank 38.

The hydraulic control system for the beforedescribed conveyor 10 is illustrated in FIG. 3. As shown therein, the hydraulic control system comprises a double, vane-type, fluid pump 50 and a constant pressure, variable volume-type, fluid pump 52 which are driven by a single electrically operated, pump driving motor 54 connected to a suitable source of electrical current (not shown) by the electrical leads 56. The hydraulic fluid is stored in a storage tank or reservoir 58 and is supplied throughout the hydraulic control system by the pumps 50, 52 under the control of a triple valve bank 60 and a valve 62. A fluid supply conduit 64 connects the reservoir 58 with the inlets of the pumps 50, 52 for supplying hydraulic fluid from the reservoir 58 to the pumps 50, 52. A fluid supply conduit 66 connects one outlet of the double pump 50 with the valve bank 60 for supplying hydraulic fluid to the valve bank 60. A fluid return conduit 68 containing a filter 69 connects the valve bank 60 with the reservoir 58 for returning hydraulic fluid from the valve bank 60 to the reservoir 58.

The valve bank 60 comprises a triad of control valves 70, 72, 74 which are individually actuatable by the manually operable, operating levers 76, 78, and 80, respectively. The control valve 70 controls the flow of hydraulic fluid from the valve bank 60 through the fluid supply conduits 82, 84 to a hydraulically operated motor 86 which drives the crawler treads 20 to propel the head section 12. The control valve 70 is actuatable by the operating lever 76 to direct hydraulic fluid through the fluid supply conduit 82 to cause the motor 86 to forwardly propel the head section 12, and through the fluid supply conduit 84 to cause the motor 86 to rearwardly propel the head section 12. The control valve 72 controls the flow of hydraulic fluid from the valve bank 60 through the fluid supply conduits 88, 90 to a hydraulically operated motor 92 which also drives the crawler treads 20 to propel the head section 12. The control valve 72 is actuatable by the operating lever 78 to direct hydraulic fluid through the fluid supply conduit 88 to cause the motor 92 to forwardly propel the head section 12, and through the fluid supply conduit 90 to cause the motor 92 to rearwardly propel the head section 12. The control valve 74 is connected through the fluid supply conduits 94, 96 to the hydraulic jacks 18 which pivot the loading hopper 16 relative to the head section 12 to control the pivotable movements of the loading hopper 16.

The other outlet of the double pump 50 is suitably connected to supply hydraulic fluid to the fluid operated motor 24 at the direction of the manually operable, operating lever 98 of the valve 62. More specifically, a fluid supply conduit 100 connects this latter outlet of the double pump 50 with the inlet of the valve 62 for supplying hydraulic fluid to the valve 62. A fluid return conduit 101 connects the valve 62 with the fluid return conduit 68 for returning hydraulic fluid from the valve 62 to the reservoir 58. A fluid supply conduit 102 containing a check valve 103 connects an outlet of the valve 62 with the fluid operated motor 24 such that, in one direction of movement of the operating lever 98, hydraulic fluid is directed through the valve 62 to the fluid operated motor 24. The hydraulic fluid, thus supplied to the fluid operated motor 24, is exhausted from the latter to the reservoir 58 through the fluid return conduit 107.

Another outlet of the valve 62 is connected by a fluid supply conduit 104 containing a check valve 106 to the fluid supply conduit 66 such that, in a second direction of movement of the operating lever 98, hydraulic fluid is directed from the valve 62 to the valve bank 60. This connection of the valve 62 enables hydraulic fluid flowing directly from the double pump 50 to the valve bank 60 to be supplemented by hydraulic fluid from the valve 62 and, thereby, the hydraulic fluid passing from the valve bank 60 to the motors 86, 92 to be increased for increasing the driven speed of the crawler treads 20. In order to direct hydraulic fluid to the fluid operated motor 24 during this latter flow, a bypass fluid conduit 108 containing a manually operable control valve 110 is connected between the fluid supply conduit 100 and the fluid supply conduit 102 downstream of the check valve 103 in the latter.

A bypass is provided for diverting hydraulic fluid flowing through the fluid supply conduit 102 to prevent the initial operation of the fluid operated motor 24 from overstressing the endless conveying belt 22. This bypass comprises a fluid conduit 112 communicating with the fluid supply conduit 102 between the check valve 103 and the valve 62, and containing a restriction valve 114. The end of the fluid conduit 112 remote from the fluid supply conduit 102 supplies hydraulic fluid to a normally open, sequence valve 116 which, in its open position, directs the hydraulic fluid through a fluid return conduit 118 and a drain 120 to the reservoir 58. A pilot fluid conduit 122, connected to the fluid supply conduit 102 adjacent the fluid operated motor 24 and containing an adjustable, restriction valve 124, is connected to the sequence valve 116 to supply hydraulic fluid to the latter for maintaining it in a closed position during continued operation of the fluid operated motor 24. Thus, during the initial operation of the fluid operated motor 24, a portion of the hydraulic fluid in the fluid supply conduit 102 passes through the sequence valve 116; and the fluid operated motor 24 is, resultantly, initially operated at a slow speed. However, when sufficient hydraulic fluid accumulates in the pilot fluid conduit 122 to close the sequence valve 116, all of the hydraulic fluid in the fluid supply conduit 102 flows to the fluid operated motor 24. Thus, the operation of the fluid operated motor 24 then proceeds at its higher, normal operating speed. By adjusting the restriction valve 124, the time lag before this higher operating speed of the fluid operated motor 24 commences may be varied as required to obtain the desired initial acceleration of the endless conveying belt 22.

The outlet of the pump 52 is connected to a fluid supply conduit 126 which branches into a pair of fluid supply conduits 126a, 126b. The fluid supply conduit 126a contains a check valve 128 and, downstream of the check valve 128, is connected to a fluid supply conduit 130 which directs hydraulic fluid to a fluid operated motor 132 which rotates the shaft 34 carrying the reels 32. The fluid operated motor 132, as shown in FIG. 3, discharges hydraulic fluid through a fluid return conduit 134 to a drain 136 connected to the reservoir 58. The fluid supply conduit 126a, downstream of its connection to the fluid supply conduit 130, is connected to a fluid conduit 131 which is connected to the reservoir 58 through a drain 133 and contains a relief valve 135. The fluid supply conduit 126b is connected to a fluid supply conduit 138 which directs hydraulic fluid to the spring loaded cylinder 140 which controls the brake 36 for maintaining the latter normally released from the reels 32.

A fluid conduit 142 is suitably connected to the hydraulic jack 42 to supply hydraulic fluid to the hydraulic jack 42 for extending the latter. The fluid conduit 142 contains a check valve 144 which is pilot operated by hydraulic fluid in the fluid supply conduit 126b such that the pressure of the hydraulic fluid in the latter conduit normally maintains the check valve 144 in an open position. The fluid conduit 142 is connected to a fluid return conduit 146 intermediate the hydraulic jack 42 and the pilot operated, check valve 144. The fluid return conduit 146 contains a manually operable valve 148 and discharges hydraulic fluid through a drain 150 to the reservoir 58. It will be understood that the valve 148 is normally closed throughout the operation of the conveyor 10 and is opened to permit hydraulic fluid to flow through the fluid return conduit 146 only when all tension must be removed from the endless conveying belt 22 such as during the repair of the conveyor 10.

The end of the fluid conduit 142 remote from the hydraulic jack 42 communicates through a control valve 152, alternatively, with the fluid supply conduit 126a and a fluid return conduit 154 connected through a drain 156 to the reservoir 58. The fluid return conduit 154 contains a low pressure relief valve 158 such that, during its communication with the fluid conduit 142, the quantity of hydraulic fluid flowing through the fluid return conduit 154 to the reservoir 58 is restricted as dictated by the relief valve 158. The relief valve 158 is preset to maintain the hydraulic fluid in the hydraulic jack 42, when the latter is exhausting, at a substantial pressure sufficient to cause the hydraulic jack 42 to maintain tension on the endless conveying belt 22. Thus, for example, when the fluid supply conduit 126a is conveying hydraulic fluid at a pressure of substantially 1700 pounds per square inch to the hydraulic jack 42, it has been found to be beneficial that the relief valve 158 be preset to maintain the hydraulic fluid in the hydraulic jack 42 at a pressure of around 1300 pounds per square inch. In this manner, sufficient tension is maintained on the endless conveying belt 22 to support the latter and prevent its collapsing during the exhausting of the hydraulic jack 42.

The control valve 152 is biased by a spring 160 to a position wherein the fluid supply conduit 126a communicates with the fluid conduit 142 for supplying hydraulic fluid to the hydraulic jack 42. The control valve 152 is actuatable by hydraulic fluid from the fluid supply conduit 82, through a pilot fluid conduit 162 connecting the fluid supply conduit 82 with the control valve 152, to a position wherein the fluid conduit 142 and the fluid return conduit 154 are in communication for exhausting the hydraulic jack 42. It will be seen that, due to this connection of the fluid supply conduit 82 and the control valve 152 by the pilot fluid conduit 162, actuation of the motor 86 to move the head section 12 forwardly (from the tail section 14) automatically moves the control valve 152 to exhaust the hydraulic jack 42. Furthermore, the beforedescribed relationship of the check valve 144 and the fluid supply conduit 126b insures that hydraulic fluid is maintained in the hydraulic jack 42 at a pressure sufficient to maintain tension on the endless conveying belt 22, in the event that the pressure of the hydraulic fluid in the fluid supply conduits 126a, 126b falls to an unsafe value.

In summary, it will be seen that the reservoir 58 serves as the source of the hydraulic fluid circulated in the hydraulic control system and that the hydraulic jack 42 functions as a fluid motor to operate the belt storage apparatus or means formed by the stationary and movable banks 38, 40, respectively, of rotatable rollers. Hydraulic fluid from the reservoir 58, is supplied to the hydraulic jack 42, and exhausted from the latter, through a conduit means comprising the conduits 64, 126, 126a, 142, and 154. The hydraulic fluid thus supplied to the hydraulic jack 42 is pumped through the conduit means by the pump 52; and a valve means consisting of the control valve 152 is interposed within the conduit means, intermediate the conduits 126a, 142, 154, for alternatively directing hydraulic fluid to the hydraulic jack 42 and exhausting hydraulic fluid from the latter. The relief valve 158, of course, maintains the hydraulic fluid in the hydraulic jack 42, when the latter is exhausting, at a pressure sufficient to cause the hydraulic jack 42 to maintain tension on the conveying belt 22.

In addition, the motors 86, 92 function as a motor means for effecting relative movement of the head and tail sections 12, 14, respectively. The motor 86, furthermore, is connected to the control valve 152, such that its actuation to move the head and tail sections 12, 14 one from another causes pressurized fluid to flow through the pilot fluid conduit 162 to actuate the control valve 152. The fluid supply conduit 126b functions as a pilot conduit to normally maintain the check valve 144 open. As, however, the fluid supply conduit 126b is connected to the fluid supply conduit 126 of the aforedescribed conduit means, in the event that the hydraulic fluid in the latter falls below a minimum pressure, this drop in pressure will cause the check valve 144 to close.

Furthermore, the fluid operated motor 24 functions as a motor means for longitudinally driving the conveying belt 22. The aforedescribed bypass for diverting hydraulic fluid flowing through the fluid supply conduit 102, moreover, serves as a means for temporarily bypassing a portion of the hydraulic fluid in the fluid supply conduit 102 around the fluid operated motor 24 during the initial operation of the latter. Thus, as was previously pointed out, overstressing of the conveying belt 22 during the initial operation of the fluid operated motor 24 is prevented.

The operation of the beforedescribed conveyor 10 is believed to be apparent from the foregoing description; however, a brief summary of this operation hereinafter follows. With the tail section 14 carried by the head section 12, the conveyor 10 may be driven as a unit by the motor 92 through the actuation of the operating lever 78.

At this time, furthermore, the endless conveying belt 22 may be longitudinally driven by the fluid operated motor 24 through the operating lever 98. The initial longitudinal movement of the, thus driven, endless conveying belt 22 is maintained at a relatively low speed due to the sequence valve 116, but automatically increases in speed after a period of initial low velocity due to the increased pressure of the hydraulic fluid in the pilot fluid conduit 122.

With the tail section 14 detached form the head section 12, the head section 12 may be longitudinally moved from the tail section 14 by the motor 86 through the operating lever 76. The flow of hydraulic fluid through the fluid supply conduit 82 occurring during this movement of the head section 12 causes hydraulic fluid to flow into the pilot fluid conduit 162, thus shifting the control valve 152 to its position wherein the fluid conduit 142 and the fluid return conduit 154 are in communication. As the check valve 144 has been previously opened by hydraulic fluid in the fluid supply conduit 126b, hydraulic fluid in the hydraulic jack 42 exhausts through the fluid return conduit 154 at this time. Due, however, to the disposition of the relief valve 158 in the fluid return conduit 154, the hydraulic fluid in the hydraulic jack 42 is maintained at a pressure sufficient to maintain tension on the endless conveying belt 22 throughout the exhausting of the hydraulic jack 42. In this manner, the endless conveying belt 22 is automatically increased in effective length as the head section 12 is driven from the tail section 14. Similarly, the wire ropes 30 also automatically increase in effective length during this movement of the head section due to the release of the brake 36 by the hydraulic fluid in the fluid supply conduit 138. The endless conveying belt 22 may be longitudinally driven by the fluid operated motor 24 during this extension of the endless conveying belt 22 and is, thus, operative to convey material during this extension.

When the head section 12 is to be driven rearwardly towards the tail section 14, the operating lever 76 is suitably operated to direct hydraulic fluid through the fluid supply conduit 84 to the motor 86. This direction of the hydraulic fluid permits the spring 160 to return the control valve 152 such that the latter communicates the fluid supply conduit 126a with the fluid conduit 142, thereby supplying hydraulic fluid to the hydraulic jack 42 for extending the latter and, conversely, shortening the effective length of the endless conveying belt 22.

Although I have hereinbefore illustrated and described in detail only one embodiment of a fluid pressure control system constructed in accordance with my invention, it will be understood that my invention is not limited simply to this described embodiment, but contemplates other embodiments and variations which utilize the concepts and teachings of my invention.

Having thus described my invention, I claim:

1. In a control system for an extendible conveyor which comprises a plurality of relatively movable frame sections, a conveying belt extending longitudinally between said frame sections, belt storage means connected to said conveying belt and operable to vary the effective length of said conveying belt during relative movement of said frame sections, and a fluid motor connected to said belt storage means to operate said belt storage means, the combination of:
   a source of pressure fluid;
   conduit means connecting said fluid motor with said source of pressure fluid for supplying pressure fluid from said source to said fluid motor and exhausting pressure fluid from said fluid motor;
   valve means interposed within said conduit means for alternatively directing pressure fluid through said conduit means to said fluid motor and exhausting pressure fluid from said fluid motor through said conduit means; and
   a valve for maintaining the pressure fluid in said fluid motor, when said fluid motor is exhausting, at a pressure sufficient to cause said fluid motor to maintain tension on said conveying belt.

2. A control system according to claim 1, wherein a motor means is provided for effecting relative movement of said frame sections, and said motor means is connected to said valve means to control the operation of the latter.

3. A control system according to claim 2, wherein said motor means is fluid operated, and a conduit connects said motor means with said valve means for conveying pressure fluid from said motor means to said valve means to actuate the latter.

4. A control system according to claim 3, wherein said conduit connects said motor means with said valve means such that actuation of said motor means to move said frame sections one from another actuates said valve means to exhaust said fluid motor.

5. A control system according to claim 1, wherein a conduit communicates with said source to receive pressure fluid from said source and is connected to said conduit means to restrict the exhausting of pressure fluid from said fluid motor in the event that the pressure of the pressure fluid from said source falls below a minimum pressure.

6. A control system according to claim 5, wherein a fluid operated motor means is provided for effecting relative movement of said frame sections, and a conduit connects said motor means with said valve means for conveying pressure fluid from said motor means to said valve means to cause said fluid motor to be exhausted when said motor means is actuated to move said frame sections one from another.

7. A control system according to claim 1, wherein a fluid operated motor means is provided for longitudinally driving said conveying belt, a conduit connects said motor means with the source of pressure fluid for supplying pressure fluid from said source to said motor means to actuate the latter, and means are provided for temporarily bypassing a portion of the pressure fluid flowing into said conduit from said source around said motor means during the initial actuation of said motor means by pressure fluid.

8. In a control system for an extendible conveyor which comprises a plurality of relatively movable frame sections, a conveying belt extending longitudinally between said frame sections, belt storage means connected to said conveying belt and operable to vary the effective length of said conveying belt during relative movement of said frame sections, and a first fluid operated motor connected to said belt storage means to operate said belt storage means, the combination of:
   a source of pressure fluid;
   a first conduit connected to said source for conveying pressure fluid from said source;
   a second conduit connected to said first fluid operated motor;
   a third conduit connected to said source to discharge exhausting pressure fluid thereto;
   first valve means interposed intermediate said conduits and movable between a position wherein said first and second conduits are in communication and a position wherein said second and third conduits are in communication;
   means for supplying pressure fluid through said first and second conduits to said motor when said first valve means communicates said first and second conduits; and
   second valve means disposed within said third conduit for maintaining the pressure fluid in said first fluid operated motor, when said first valve means communicates said second and third conduits, at a pressure sufficient to cause said first fluid operated motor to maintain tension on said conveying belt.

9. A control system according to claim 8, wherein a second fluid operated motor is provided for effecting relative movement of said frame sections, and a fourth conduit connects said source, said second fluid operated motor, and said first valve means such that the operation of said second fluid operated motor controls the operation of said first valve means.

10. A control system according to claim 9, wherein said fourth conduit is connected to said second fluid operated motor and said first valve means such that actuation of said second fluid operated motor to move said frame sections one from another actuates said first valve means to communicate said second and third conduits.

11. A control system according to claim 10, wherein said extendible conveyor includes a rope extending between said frame sections, reel means are provided for varying the effective length of said rope during relative movement of said frame sections, fluid releasable brake means are provided for locking said reel means, a fifth conduit extends between said source and said brake means for supplying pressure fluid to said brake means to release the latter from said reel means, and said fifth conduit is connected to said second conduit to restrict the exhausting of pressure fluid from said first fluid operated motor in the event that the pressure of the pressure fluid from said source falls below a minimum pressure.

12. A control system according to claim 11, wherein a pilot valve is interposed within said second conduit, and said fifth conduit is connected to said pilot valve to supply pressure fluid to said pilot valve for maintaining the latter open.

13. A control system according to claim 8, wherein said extendible conveyor includes a rope extending between said frame sections, reel means are provided for varying the effective length of said rope during relative movement of said frame sections, fluid releasable brake means are provided for locking said reel means, a fifth conduit extends between said source and said brake means for supplying pressure fluid to said brake means to release the latter from said reel means, and said fifth conduit is connected to said second conduit to restrict the exhausting of pressure fluid from said first fluid operated motor in the event that the pressure of the pressure fluid from said source falls below a minimum pressure.

14. A control system according to claim 13, wherein a pilot valve is interposed within said second conduit, and said fifth conduit is connected to said pilot valve to supply pressure fluid to said pilot valve for maintaining the latter open.

15. A control system according to claim 8, wherein a fluid operated motor means is provided for longitudinally driving said conveying belt, a conduit connects said motor means with the source of pressure fluid for supplying pressure fluid from said source to said motor means to actuate the latter, and means are provided for temporarily passing a portion of the pressure fluid flowing into said conduit from said source around said motor means during the initial actuation of said motor means by pressure fluid.

16. In a control system for an extendible conveyor which comprises a plurality of relatively movable frame sections, a conveying belt extending longitudinally between said frame sections, belt storage means connected to said conveying belt operable to vary the effective length of said conveying belt during relative movement of said frame sections, and a fluid motor connected to said belt storage means to operate said belt storage means, the combination of:
a source of pressure fluid;
a fluid operated fluid motor connected to said conveying belt for longitudinally driving the latter;
a conduit means connecting said source of pressure fluid with said latter mentioned fluid motor for supplying pressure fluid from said source to said latter mentioned fluid motor to actuate the latter; and
means for temporarily bypassing a portion of the pressure fluid flowing into said conduit means from said source around said latter mentioned fluid motor during the initial actuation of said latter mentioned fluid motor by pressure fluid.

17. In a control system for an extendible conveyor which comprises a plurality of relatively movable frame sections, a conveying belt extending longitudinally between said frame sections, belt storage means connected to said conveying belt operable to vary the effective length of said conveying belt during relative movement of said frame sections, and a fluid motor connected to said belt storage means to operate said belt storage means, the combination of:
a source of pressure fluid;
conduit means connecting said fluid motor with said source of pressure fluid for supplying pressure fluid from said source to said fluid motor and exhausting pressure fluid from said fluid motor;
valve means interposed within said conduit means for alternatively directing pressure fluid through said conduit means to said fluid motor and exhausting pressure fluid from said fluid motor through said conduit means; and
means for maintaining pressure fluid in said fluid motor, during the exhausting of the latter, at a predetermined pressure.

18. A control system according to claim 17, wherein a motor means is provided for effecting relative movement of said frame sections, and said motor means is connected to said valve means to control the operation of said valve means.

References Cited

UNITED STATES PATENTS

| | | | |
|---|---|---|---|
| 2,744,385 | 5/1956 | Hohenner | 60—53 |
| 2,858,933 | 11/1958 | Hardy | 198—139 |
| 2,858,935 | 11/1958 | Lo Presti | 198—139 |
| 2,893,539 | 7/1959 | Baechli | 198—139 |
| 2,955,917 | 10/1960 | Roberts | 60—50 |

EVON C. BLUNK, *Primary Examiner.*

RICHARD E. AEGERTER, *Examiner.*